United States Patent Office 2,817,681
Patented Dec. 24, 1957

2,817,681

ARYLACETIC ACIDS

Marrine A. Terpstra, Kirkwood, Mo., assignor to Monsanto Chemical Company, St. Louis, Mo., a corporation of Delaware No Drawing. Application December 20, 1954
Serial No. 476,559

7 Claims. (Cl. 260—521)

This invention relates to the preparation of arylacetic acids and more specifically pertains to the hydrolysis of arylacetonitriles to the corresponding arylacetic acids.

Arylacetic acids are useful intermediates in the synthesis of complex organic compounds such as dyes and pharmaceuticals. For example, the dialkoxyarylacetic acids such as the dimethoxy-, diethoxy-, and ethoxy, methoxy-phenylacetic acids are employed in the synthesis of papaverine and analogues of papaverine which are useful as antispasmodics. Phenylacetic acid is useful as an antiseptic. Esters of phenylacetic acid as well as the acid itself are used in perfumes. Alkyl and alkoxy substituted phenylacetic acids and esters thereof also are useful in the preparations of perfumes.

Numerous methods for preparing arylacetic acids have been proposed. The most common method heretofore employed for the preparation of arylacetic acids involves the hydrolysis of the corresponding arylacetontrile. The prior art methods suggest boiling the arylacetonitrile with an aqueous solution of barium hydroxide or potassium hydroxide and acidifying the resulting reaction mixture to precipitate the free acid, heating to boiling the arylacetonitrile with an alcoholic solution of potassium hydroxide or sodium hydroxide followed by acidifying to precipitate the free acid, or by heating with alcoholic HCl. All of these proposed methods produce highly erratic results. These hydrolysis reactions are, in general, rather sluggish and require a rather long induction period of boiling before any appreciable hydrolysis begins. Since the arylacetonitriles are unstable to heat forming undesirable byproducts on prolonged heating, the yields of the resulting arylacetic acids are obviously low and of an exceptionally low quality. Consequently, the arylacetic acids so produced must be subjected to various purification processes before they can be employed in perfumes or in subsequent steps in the preparation of pharmaceuticals.

Only occasionally, when the above processes are carried out under very precise laboratory control, are good yields of the desired arylacetic acid obtained. However, a subsequent preparation employing the very same control techniques may result not only in a low yield of the desired arylacetic acid but also a product low in quality.

It has now been discovered that arylacetic acids and especially phenylacetic acids such as phenylacetic acid, dialkylphenylacetic acids and dialkoxyphenylacetic acids can be produced through the hydrolysis of the corresponding arylacetonitrile by adding to the hydrolysis medium a minor proportion of the desired acid or a salt of the acid. By a "minor proportion" as employed herein, is meant an amount less than a quantity equal to the quantity of nitrile present. Obviously for most efficient industrial operation the amount of acid or its equivalent in a salt of the acid to be added will be less than one-half the quantity of acid being produced. The benefits of the process of this invention can be achieved by employing the acid or its equivalent in a salt in amounts as low as about 0.5% by weight based on the nitrile. However, maximum effects to be obtained by the process of this invention appear to be achieved by the use of from 5% to 10% by weight of the acid or its equivalent in a salt based on the nitrile. Although larger amounts of the acid or its equivalent in a salt can be employed without deleterious effects, no appreciable advantage or acceleration of hydrolysis has been noted over that achieved with the 5% to 10% quantities of the acid or its equivalent in a salt based on the nitrile. Hence, only a small quantity of the acid or its equivalent in a salt need be employed in the process of this invention. By adding to the reaction system a small quantity of the acid to be produced by the hydrolysis, or the equivalent amount of the acid in a salt, the hydrolysis reaction commences substantially immediately instead of following the ususal course involving an uncertain period of delay or induction. Thus, the adidtion of the acid per se or a salt of the acid initiates the hydrolysis as well as accelerating the reaction.

The improved hydrolysis process of this invention can be employed with acidic hydrolysis or alkaline hydrolysis of arylacetonitriles in aqueous, alcoholic or hydrocarbon solvent mediums. For example, phenylacetonitrile is heated with an aqueous solution of sodium hydroxide containing less than 10% by weight and preferably about 5% by weight of phenylacetic acid or the equivalent amount of sodium phenylacetate based on the nitrile according to a preferred embodiment of the process of this invention. The hydrolysis carried out in this manner starts instantly and proceeds quite readily and smoothly producing a high yield of high quality phenylacetic acid upon acidification of the resulting reaction mixture. Or, phenylacetonitrile is heated with alcoholic HCl or sodium hydroxide in the presence of a small amount of phenylacetic acid or salt thereof and the resulting phenylacetic acid can be recovered from the alcoholic solution in any desired manner. Likewise, the acidic or alkaline hydrolysis can be carried out in the presence of a hydrocarbon solvent such as hexane, heptane, benzene, toluene, or chlorinated solvents such as mono- and dichlorobutanes, chlorohexene, monochlorobenzene and the like.

The process of this invention can be carried out at any suitable temperature, however, the hydrolysis process appears to progress more rapidly at or near temperatures corresponding to the reflux temperature (boiling point) of the reaction mixture than at temperatures substantially below such reflux temperatures. Reaction temperatures substantially above reflux temperature should, of course, be avoided where the reactants or the final product are for some reason sensitive to heat, i. e., decompose, discolor etc., but otherwise such higher temperatures need not be avoided.

The following specific examples will serve to illustrate the process of this invention. In these examples the term "parts" is employed to indicated parts by weight.

*Example I*

To a reactor fitted with a reflux condenser, an agitator, a means for heating and a charging port, there is charged 155 parts of water, 78 parts of sodium hydroxide and 5.4 parts of 3-methoxy-4-ethoxyphenylacetic acid. The resulting mixture is stirred and heated to about 55° C. To the resulting hot solution there is added 110 parts of the melted (50° to 60° C.) product obtained from the reaction of 3-methoxy-4-ethoxybenzyl chloride and sodium cyanide assaying 90% by weight of 3-methoxy-4-ethoxyphenylacetonitrile and having been distilled and collected at 165° C. to 220° C. at 5.0 mm. Hg. The resulting mixture is stirred and heated to its reflux temperature, about 120° C. Hydrolysis begins just before or about the time the reaction mixture reaches 120° C. as evidenced by the evolution of ammonia which proceeds at a slowly increasing rate at first but reaches a peak in 15 to 20 minutes. At the peak of reaction, the reaction temperature will be 108° to 110° C., about 10° to 12° C., below the initial temperature. In about 5 to 10 minutes the reaction temperature begins to increase indicating that the peak of the hydrolysis reaction is passed. In another 30 to 40 minutes, about 60 minutes total elapsed time, the temperature of the reacting mixture reaches about 120° C. and the hydrolysis reaction is substantially complete. However, it is usually desirable to maintain the reacting mixture at its reflux temperature until ammonia no longer comes off or up to a total of about 3 hours.

The resulting aqueous solution is cooled to 100° C., 620 parts of water is added thereto and the resulting quenched mass is cooled to 35° C. To the cooled dilute solution there is added 18° Bé. hydrochloric acid with stirring and cooling to maintain a temperature of from 30 to 40° C. until the resulting solution has a pH of about 7.0, usually 200 parts of acid is required. The resulting solution is clarified and decolorized by extracting with toluene heating with charcoal at 90° C. and then filtering. The decolorized and clarified solution is cooled again to about 30° to 35° C. and acidified slowly with hydrochloric acid to about a pH of 5.5 or until crystals form. The resulting acidified mixture is cooled as rapidly as possible to about 0° to 5° C. adding more hydrochloric acid until the mother liquor has a pH of about 2.0. The acidic mixture is stirred for about one hour and then filtered. The filter cake of crystalline 3-methoxy-4-ethoxyphenylacetic acid is a fine white crystalline product, and, when dried, represents a yield of about 91% based on the nitrile.

In contrast to the process of Example I which illustrates the process of this invention carried out on an industrial scale, the following process wherein 3-methoxy-4-ethoxyphenylacetic acid was not added to the hydrolysis medium.

Example II

The process described in Example I is repeated except that there is omitted the addition of the 5.4 parts of 3-methoxy-4-ethoxyphenylacetic acid to the aqueous alkaline solution prior to charging the nitrile. In this process little or no ammonia could be detected after the reaction mixture had been refluxing for 10 minutes. Thereafter very small amounts of ammonia could be detected but finally after about 2.5 hours the hydrolysis reaction had reached a peak as evidenced by the profuse liberation of ammonia and a drop in reaction temperature. An additional two to three hours of heating is required to complete the hydrolysis reaction giving a total reaction time of almost 6 hours. The yield of 3-methoxy-4-ethoxyphenylacetic acid is about 75% to 80% based on the nitrile charged.

Example III

The process described in Example I is repeated except that 6.3 parts of sodium 3-methoxy-4-ethoxyphenylacetate are added in place of the 5.4 parts of the acid. By this process there is recovered 102 parts of 3-methoxy-4-ethoxyphenylacetic acid from the hydrolysis of the nitrile.

Example IV

The process of Example I is repeated employing 102 parts of a melted nitrile product, prepared in a manner similar to that described in Example I, assaying 90% by weight 3,4-dimethoxyphenylacetonitrile in place of 3-methoxy-4-ethoxyphenylacetonitrile and 6 parts 3,4-dimethoxyphenylacetic acid in place of 3-methoxy-4-ethoxyphenylacetic acid. By this process there is produced 92 parts of 3,4-dimethoxyphenylacetic acid by the hydrolysis of the nitrile.

Example V

The process of Example I is repeated employing 118 parts of a melted product prepared in a manner similar to that described in Example I, assaying 95% 3,4-diethoxyphenylacetonitrile in place of 3-methoxy-4-ethoxyphenylacetonitrile and 5 parts of 3,4-diethoxyphenylacetic acid in place of 3-methoxy-4-ethoxyphenylacetic acid. By this process there is produced 110 parts of 3,4-diethoxyphenylacetic acid by the hydrolysis of the nitrile.

Example VI

The process of Example I is repeated employing 67 parts of phenylacetonitrile and 3 parts of phenylacetic acid in place of the dialkoxyphenylacetonitrile and acid. From this process there can be recovered a yield of phenylacetic acid from the hydrolysis of the nitrile of about 90%.

In the above described processes there can be employed potassium hydroxide, barium hydroxide, calcium hydroxide or any of the other alkali metal and alkaline earth hydroxides or oxides in place of sodium hydroxide in the alkaline hydrolysis of the nitriles. Where the hydrolysis of the nitrile is carried out in an acidic medium although any of the mineral acids can be employed, hydrochloric acid is preferred in the acidification step for recovery of the free phenylacetic acids although sulfuric and phosphoric acids can also be used.

The hydrolysis process of this invention can be employed with any arylacetonitrile and is particularly applicable to the hydrolysis of phenylacetonitriles having the formula

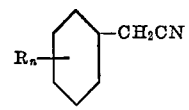

wherein R is hydrogen, an alkyl group or an alkoxy group and preferably where the alkyl and alkoxy groups contain one to five carbon atoms and wherein $n$ is a number from 0 to 3 inclusive (when $n$ is 0, R is, of course, hydrogen). The preferred phenylacetonitrile reactants include among others such specific compounds as phenylacetonitrile, tolylacetonitriles, 2,3 - dimethylphenylacetonitrile, 2,5 - dimethylphenylacetonitrile, 3,5 - dimethylphenylacetonitrile, 2- and 4-ethylphenylacetonitrile, 4-isopropylphenylacetonitrile, 4 - ethoxyphenylacetonitrile, 2 - butoxyphenylacetonitrile, 2,3 - dimethoxyphenylacetonitrile, 3,4-dimethoxyphenylacetonitrile, 3,4,5-trimethoxyphenylacetonitrile, 3-methoxyphenylacetonitrile, 4-methoxyphenylacetonitrile, 2,3-diethoxyphenylacetonitrile, 4-ethoxy - 3,5 - dimethoxyphenylacetonitrile, 3 - methoxy-4-ethoxyphenylacetonitrile, 3,4 - diethoxyphenylacetonitrile, 3,4-dipropoxyphenylacetonitrile, 3,4-dibutoxyphenylacetonitrile, 3,4 - diisopropoxyphenylacetonitrile, 2 - propoxyphenylacetonitrile, 2 - isoamoxyphenylacetonitrile, 3-propoxy-4-methoxyphenylacetonitrile, 3-ethoxy-4-isopropoxyphenylacetonitrile, 3-propoxy-4-ethoxyphenylacetonitrile, and 3-isopropoxy-4-methoxyphenylacetonitrile.

R as well as the nuclear benzene ring can contain such substituent groups as halogen, nitro, hydroxy, alkoxy, aryl, alkyl, aroxy, etc. Specific compounds of this class include, among others, 4-ethoxy-2 (and 3)-nitrophenylacetonitrile, 2,5-dimethoxy-3-methylphenylacetonitrile, 4-hydroxy - 3,5 - dimethoxyphenylacetonitrile, 2-hydroxy-3-methoxyphenylacetonitrile, 3 - hydroxy - 4 - methoxyphenylacetonitrile, 4 - hydroxy - 3 - methoxyphenylacetonitrile, 2,3 - diethoxy - 5 - nitrophenylacetonitrile, 2 - methoxy - 5 - propylphenylacetonitrile, 2 - isopropoxy-5 - methylphenylacetonitrile, 4 - phenylphenylacetonitrile, 4,4' - bis(phenylacetonitrile), and o - benzylphenylacetonitrile.

To those skilled in the art many obvious deviations from the precise manipulative steps set forth in the specific examples will be apparent, also the precise quantities of materials employed can be adjusted according to the sized limitations of the equipment employed. Hence, it is to be understood that the above description is given by way of illustration only and not of limitation and that deviations are possible within the spirit of the invention.

What is claimed is:

1. In the process of preparing an arylacetic acid by the hydrolysis of an arylacetonitrile, the step comprising adding an arylacetonitrile to a hydrolysis medium containing a minor proportion, at least about 0.5% by weight based on the nitrile, of a substance selected from the class consisting of the arylacetic acid and its salts.

2. In the preparation of an arylacetic acid by the hydrolysis of an arylacetonitrile, the steps comprising adding an arylacetonitrile to an aqueous hydrolysis medium containing a minor proportion, at least about 0.5% by weight, of the arylacetic acid based on the nitrile reactant, and maintaining the resulting mixture at its reflux temperature.

3. In the preparation of a dialkoxyphenylacetic acid by the hydrolysis of dialkoxyphenylacetonitrile, the steps comprising adding a dialkoxyphenylacetonitrile to an aqueous hydrolysis medium containing from 0.5% to 10% by weight of dialkoxyphenyl acetic acid based on the nitrile reactant, and maintaining the resulting mixture at its reflux temperature.

4. In the preparation of a dialkoxyphenylacetic acid by the hydrolysis of a dialkoxyphenylacetonitrile, the steps comprising adding the dialkoxyphenylacetonitrile to an aqueous solution of sodium hydroxide to which has been added from 0.5% to 10% by weight of the dialkoxyphenylacetic acid based on the nitrile reactant and maintaining the resulting mixture at its refluxing temperature.

5. The process of claim 4 wherein the dialkoxyacetic acid is 3,4-dimethoxyphenylacetic acid and the nitrile is 3,4-dimethoxyphenylacetonitrile.

6. The process of claim 4 wherein the dialkoxyacetic acid is 3,4-diethoxyphenylacetic acid and the nitrile is 3,4-diethoxyphenylacetonitrile.

7. The process of claim 4 wherein the dialkoxyacetic acid is 3-methoxy-4-ethoxyphenylacetic acid and the nitrile is 3-methoxy-4-ethoxyphenylacetonitrile.

References Cited in the file of this patent

Sabatier: Catalysis in Organic Chemistry, page 3 (1922).

Adams et al.: Organic Synthesis, Coll. vol. 1, page 436 (1941).